United States Patent
Levanen et al.

(10) Patent No.: US 11,843,405 B2
(45) Date of Patent: Dec. 12, 2023

(54) FREQUENCY OFFSET ESTIMATION AND REDUCTION

(71) Applicant: NOKIA SOLUTIONS AND NETWORKS OY, Espoo (FI)

(72) Inventors: Toni Aleksi Levanen, Tampere (FI); Carlos Baquero Barneto, Tampere (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/195,003

(22) Filed: May 9, 2023

(65) Prior Publication Data

US 2023/0370101 A1 Nov. 16, 2023

(30) Foreign Application Priority Data

May 11, 2022 (FI) ........................................ 20225412

(51) Int. Cl.
*H04B 1/10* (2006.01)
*H04B 15/00* (2006.01)
*H04L 27/00* (2006.01)

(52) U.S. Cl.
CPC ........................................ *H04B 1/10* (2013.01)

(58) Field of Classification Search
CPC ...... H04B 1/10; H04B 1/1027; H04B 1/1081; H04B 1/12; H04B 1/123; H04B 1/16; H04B 15/00; H04B 15/02; H04B 15/04; H04B 15/06; H04L 27/0014; H04L 27/0024; H04L 27/0026; H04L 27/2657; H04L 27/266; H04L 27/2672
See application file for complete search history.

(56) References Cited

U.S. PATENT DOCUMENTS

| | | | |
|---|---|---|---|
| 10,084,622 B2 | 9/2018 | Wei | |
| 11,444,643 B2* | 9/2022 | Ray | ...................... H04B 1/1027 |
| 2009/0147836 A1* | 6/2009 | Chen | ................... H04L 27/0014 |
| | | | 375/295 |
| 2010/0080112 A1 | 4/2010 | Bertrand et al. | |

(Continued)

FOREIGN PATENT DOCUMENTS

| | | |
|---|---|---|
| CN | 112995078 A | 6/2021 |
| WO | 2015/154801 A1 | 10/2015 |

(Continued)

OTHER PUBLICATIONS

Office Action and Search Report dated Oct. 25, 2022 corresponding to Finnish Patent Application No. 20225412.

(Continued)

*Primary Examiner* — Quochien B Vuong
(74) *Attorney, Agent, or Firm* — SQUIRE PATTON BOGGS (US) LLP

(57) ABSTRACT

This document discloses a solution for reducing a frequency offset. According to an aspect, a method comprises: acquiring a signal distorted by the frequency offset; estimating a frequency offset estimate describing the frequency offset; computing coefficients for a frequency-domain filter on the basis of a relation between the frequency offset estimate and a combination of the frequency offset estimate and an index of the frequency-domain filter; and performing frequency-domain filtering of the signal by using the computed coefficients.

12 Claims, 3 Drawing Sheets

(56) References Cited

U.S. PATENT DOCUMENTS

2017/0214555 A1     7/2017   Wei
2022/0200828 A1*   6/2022   Lee ..................... H04L 27/2657

FOREIGN PATENT DOCUMENTS

WO     WO-2015154801 A1 *   10/2015    ......... H04L 27/266
WO       2016/074165 A1     5/2016

OTHER PUBLICATIONS

Communication of Acceptance dated Apr. 5, 2023 corresponding to Finnish Patent Application No. 20225412.
D. Wang et al., "An Approximate Method of Carrier Frequency Offset (CFO) Estimation for OFDM System," In Proc. 2014 IEEE 80th Vehicular Technology Conference (VTC2014—Fall), Vancouver, Canada, Sep. 14, 2014, pp. 1-5.
Extended European Search Report dated Sep. 18, 2023 corresponding to European Patent Application No. 23170630.0.

* cited by examiner

FREQUENCY OFFSET ESTIMATION AND REDUCTION

CROSS REFERENCE TO RELATED APPLICATION

This application claims the benefit of Finnish Patent Application No. 20225412, filed May 11, 2022. The entire content of the above-referenced application is hereby incorporated by reference.

FIELD

Various embodiments described herein relate to the field of radio devices and, particularly, to estimating and correcting a frequency offset from a received signal.

BACKGROUND

Frequency offset is a characteristic that distorts radio signals communicated between radio devices. The frequency offset may be caused by an offset between local oscillators of a radio transmitter and a radio receiver, or it may be caused by a Doppler effect related to mobility of the radio transmitter with respect to the radio receiver. With multi-carrier signals, the frequency offset causes inter-sub-carrier-interference that degrades the performance of receiver signal processing and increases erroneous decoding decisions, for example. Therefore, it is beneficial to reduce the effects of the frequency offset.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: acquiring a signal distorted by a frequency offset; estimating a frequency offset estimate describing the frequency offset; computing coefficients for a frequency-domain filter on the basis of a relation between the frequency offset estimate and a combination of the frequency offset estimate and an index of the frequency-domain filter; and performing frequency-domain filtering of the signal by using the computed coefficients.

In an embodiment, the relation is defined as $$\frac{\text{Carrier frequency offset estimate}}{\text{Carrier frequency offset estimate} + \text{filter index}}.$$

In an embodiment, the means are configured to set an upper limit value for the frequency offset estimate and, if the frequency offset estimate is greater than the upper limit value, to replace the frequency offset estimate by the upper limit value in the computation of the coefficients.

In an embodiment, the relation is defined as $$\frac{\text{sign}(\varepsilon)\min(|\varepsilon|, \alpha)}{\varepsilon + k},$$

where $\varepsilon$, is the frequency offset estimate in a normalized form, a is the upper limit value, and k is the filter index.

In an embodiment, the signal comprises a plurality of sub-carriers, and the means are further configured to correct a phase rotation error, caused by the frequency offset, common to all sub-carriers of the signal as a part of another radio receiver signal processing algorithm performed on the signal.

In an embodiment, said another radio receiver signal processing algorithm is a channel equalization algorithm configured to estimate and reduce distortion caused by a radio channel on the signal, or an interference rejection combining algorithm.

In an embodiment, said another radio receiver signal processing algorithm is configured to incorporate a term $$e^{-\frac{j\pi\hat{\varepsilon}_i(N-1)}{N}}$$

where N represents a size of a Fourier transform and $\hat{\varepsilon}_i$ represents the frequency offset estimate.

In an embodiment, the computed coefficients are real-valued algebraic numbers.

In an embodiment, the means comprise at least one processor and at least one memory including computer program code, the at least one memory and computer program code configured to, with the at least one processor, cause the performance of the apparatus.

In an embodiment, the apparatus comprises a terminal device of a cellular communication system.

According to an aspect, there is provided a method comprising: acquiring a signal distorted by a frequency offset; estimating a frequency offset estimate describing the frequency offset; computing coefficients for a frequency-domain filter on the basis of a relation between the frequency offset estimate and a combination of the frequency offset estimate and an index of the frequency-domain filter; and performing frequency-domain filtering of the signal by using the computed coefficients.

In an embodiment, the relation is defined as $$\frac{\text{Carrier frequency offset estimate}}{\text{Carrier frequency offset estimate} + \text{filter index}}.$$

In an embodiment, the method comprises setting an upper limit value for the frequency offset estimate and, if the frequency offset estimate is greater than the upper limit value, replacing the frequency offset estimate by the upper limit value in the computation of the coefficients.

In an embodiment, the relation is defined as $$\frac{\text{sign}(\varepsilon)\min(|\varepsilon|, \alpha)}{\varepsilon + k},$$

where $\varepsilon$, is the frequency offset estimate in a normalized form, $\alpha$ is the upper limit value, and k is the filter index.

In an embodiment, the signal comprises a plurality of sub-carriers, and the method comprises correcting a phase rotation error, caused by the frequency offset, common to all sub-carriers of the signal as a part of another radio receiver signal processing algorithm performed on the signal.

In an embodiment, said another radio receiver signal processing algorithm is a channel equalization algorithm configured to estimate and reduce distortion caused by a radio channel on the signal, or an interference rejection combining algorithm.

In an embodiment, said another radio receiver signal processing algorithm is configured to incorporate a term $$e^{-\frac{j\pi\hat{\varepsilon}_i(N-1)}{N}}$$

where N represents a size of a Fourier transform and $\hat{\varepsilon}_i$ represents the frequency offset estimate.

In an embodiment, the computed coefficients are real-valued algebraic numbers.

In an embodiment, the method is performed by a terminal device of a cellular communication system. In another embodiment, the method is performed by an access node of the cellular communication system.

According to an aspect, there is provided a computer program product embodied on a computer-readable medium and comprising a computer program code readable by a computer, wherein the computer program code configures the computer to carry out a computer process comprising: acquiring a signal distorted by a frequency offset; estimating a frequency offset estimate describing the frequency offset; computing coefficients for a frequency-domain filter on the basis of a relation between the frequency offset estimate and a combination of the frequency offset estimate and an index of the frequency-domain filter; and performing frequency-domain filtering of the signal by using the computed coefficients.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
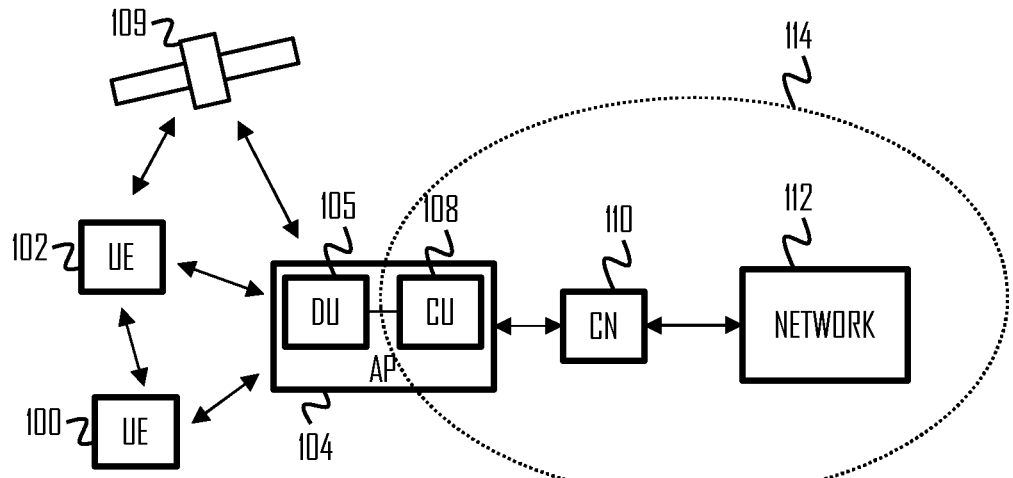

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications support at least the following relay operation modes: out-of-band relay where different carriers and/or RATs (Radio access technologies) may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below or at 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below or at 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 109 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As described in Background, the frequency offset requires compensation in an apparatus for a radio receiver. Nowadays, the radio communications are based on multi-carrier transmissions such as orthogonal frequency division multiplexing (OFDM) or single-carrier frequency division multiple access (SC-FDMA). 5G networks employ several variants of the OFDM. While the SC-FDMA is ultimately a single-carrier signal, it employs multi-carrier transmission and reception signal processing functions and, therefore, is sometimes called a virtual multi-carrier transmission scheme. In some designs, the frequency offset compensation is divided into a common phase rotation compensation and inter-(sub)carrier interference (ICI) compensation. In the common phase rotation compensation, a phase rotation common to all sub-carriers per OFDM symbol in the multi-carrier signal is compensated, per terminal device. In the ICI compensation, a frequency-domain filter is applied to compensate for inter-carrier-interferences (ICI) caused by a frequency offset that may differ per sub-carrier. The ICI compensation is particularly effective for high-data-rate modulation and coding schemes and for cases where the frequency offset is great. With smaller frequency offsets, the effects of the ICI are small and negated by sub-carrier spacing, and the low-data-rate modulation and coding schemes such as quadrature phase shift keying (QPSK) tolerate the ICI. Embodiments described below focus on the ICI compensation. The purpose of the ICI compensation is to reduce the ICI and, thus, improve decoding of data comprised in a received multi-carrier signal subjected to the ICI compensation. In other words, after the ICI compensation according to any one of the embodiments described below, the received signal may be subjected to other signal processing tasks including the decoding.

Figure 2:
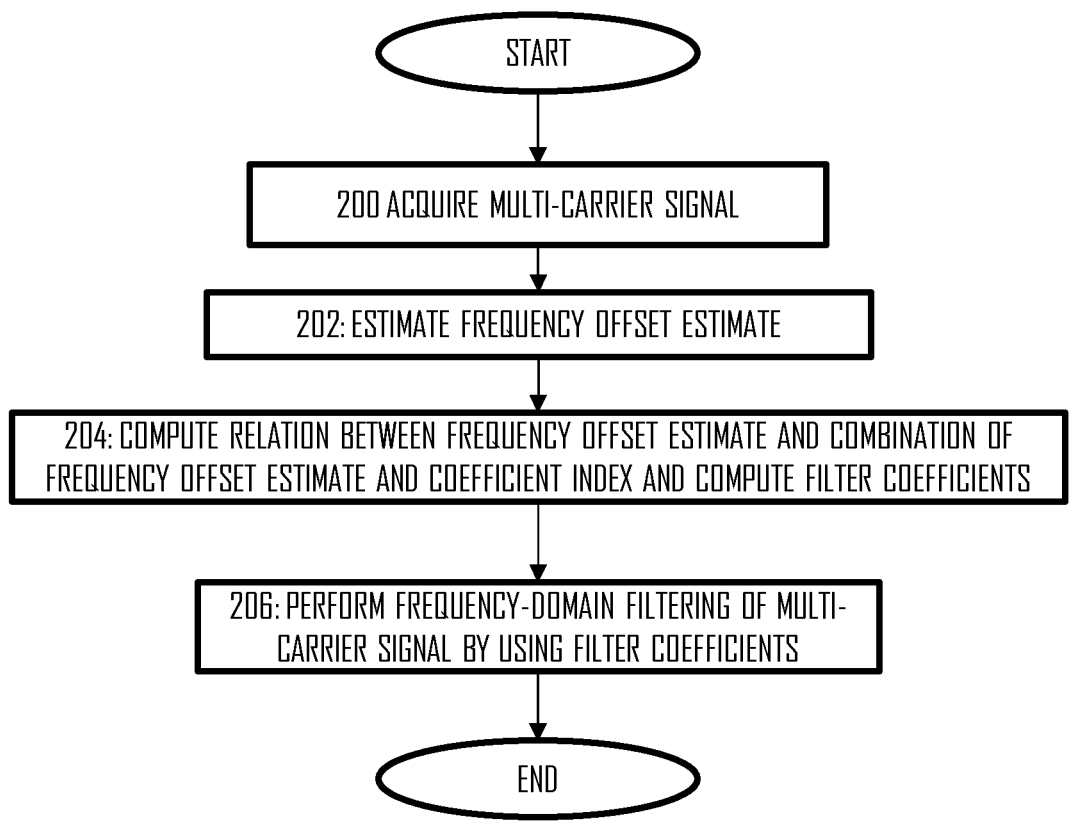
FIG. 2 illustrates a process for reducing a frequency offset according to an embodiment.

FIG. 2 illustrates an embodiment of a process for reducing the frequency offset and resulting ICI. The process may be executed by an apparatus for an access node (e.g. the DU or CU), or it may be executed by an apparatus for the terminal device 100 or 102. Referring to FIG. 2, the process comprises: acquiring (block 200) a signal distorted by a frequency offset; estimating (block 202) a frequency offset estimate describing the frequency offset; computing (block 204) coefficients for a frequency-domain filter on the basis of a relation between the frequency offset estimate and a combination of the frequency offset estimate and an index of the frequency-domain filter,; and (block 206) performing frequency-domain filtering of the multi-carrier signal by using the computed coefficients.

The frequency-domain filter performs the ICI filtering by using the computed coefficients. Using the relation between the frequency offset estimate and the combination of the frequency offset estimate and a filter coefficient index enables reduction of computational complexity because it enables the computation by using algebraic real numbers and, in other words, enables omission of computation with complex values. As a consequence, also power consumption is reduced. Another characteristic of using real numbers is related to embodiments where the filter coefficients are precomputed and stored in a memory beforehand. Using real number instead of complex-valued numbers reduces the memory requirements by a factor of 2.

The signal may be a multi-carrier signal such as the OFDM signal. However, the ICI may present with single-carrier signals that are subjected to a fast Fourier transform (FFT) as well. The ICI observed in the frequency domain results from windowing of the finite-length FFT.

The frequency offset may be computed by using any estimation algorithm known in the art. The literature presents dozens of different methods for estimating a frequency offset caused by Doppler or an offset between local oscillators of the transmitter and the receiver, and the person skilled in the art is capable of selecting a suitable estimation method based on the design of the radio receiver. Embodiments described herein focus on how the frequency offset estimate is used in computing the coefficients for the ICI compensation (reduction). Conventionally, the ICI compensation is performed by using a frequency-domain filter that is applied to frequency-domain samples of the sub-carriers via a convolution operation. The filter is conventionally limited to a desired length that may be, for example, five taps or seven taps or nine taps or 11 taps. The filter may be applied in a circular manner meaning that the sub-carrier samples are arranged circularly for the convolution operation. Thus, the sub-carrier with the lowest sub-carrier index becomes convoluted with all filter with coefficients having tap indices k=[−2, −1, 0, 1, 2] for a filter with five taps. The same principle applies to other filter lengths F, and a generic rule for the tap indices may be defined as k=[−(F−1)/2, . . . , 0, . . . , (F−1)/2].

Let us then describe the mathematics and the logic leading to the process of FIG. 2. Let us first define $\hat{\varepsilon}_i$ as the normalized frequency offset estimate for the $i^{th}$ terminal device, and let N define the size of the FFT, as described above. The normalized frequency offset $\hat{\varepsilon}_i$ may be understood as $$\hat{\varepsilon}_i = \frac{\text{Absolute frequency offset [Hz]}}{\text{Subcarrier spacing [Hz]}}.$$

The coefficients for the frequency-domain filter can then be written into the following form, as known in the literature.

$$C_i(k) = \frac{\sin(\pi(k+\hat{\varepsilon}_i))}{N\sin(\pi(k+\hat{\varepsilon}_i)/N)} e^{-\frac{j\pi(k+\hat{\varepsilon}_i)(N-1)}{N}}, \quad (1)$$

where k denotes the intra-FOC filter coefficient index. It is clear that the coefficients have complex values when k, $\hat{\varepsilon}_i \neq 0$. This also shows that the amplitude of the intra-FOC filter coefficients follow the well-known sinc-function. Next, let us reorganise the coefficient definition as $$C_i(k) = \frac{\sin(\pi(k+\hat{\varepsilon}_i))}{N\sin(\pi(k+\hat{\varepsilon}_i)/N)} e^{-\frac{j\pi(k+\hat{\varepsilon}_i)(N-1)}{N}} = \quad (2)$$

$$A_N(k,\hat{\varepsilon}_i) e^{-\frac{j\pi(k+\hat{\varepsilon}_i)(N-1)}{N}} = A_N(k,\hat{\varepsilon}_i) e^{-\frac{j\pi k(N-1)}{N}} e^{-\frac{j\pi\hat{\varepsilon}_i(N-1)}{N}},$$

where $$A_N(k,\hat{\varepsilon}_i) = \frac{\sin(\pi(k+\hat{\varepsilon}_i))}{N\sin(\pi(k+\hat{\varepsilon}_i)/N)}$$

defines an amplitude scale of the filter. Now, focusing on the reformulated definition of $C_i(k)$, we notice that the term, $$e^{-\frac{j\pi\hat{\varepsilon}_i(N-1)}{N}},$$

does not depend on the filter coefficient index k, thus it is common to all subcarriers. This means that this term can be removed from the definition of the frequency-domain filter coefficients without any loss of performance. The term can be incorporated into the common phase rotation compensation or to another receiver signal processing task that includes a phase rotation of a phase common to all sub-carriers. In case the receiver signal processing tasks include an algorithm that readily performs the common phase rotation, such as an interference rejection combining (IRC) process or a maximal ratio combining (MRC) process, this term can be ignored. In such a case, the same filter coefficients may be used to correct channel estimates and data symbols, and the IRC/MRC equalization compensates for the common phase error from the equalized data symbols.

Next, looking at the remaining exponential term, $$e^{-\frac{j\pi k(N-1)}{N}},$$

the term depends on the filter coefficient index k and the FFT size N. Considering modern communication systems, e.g., 4G LTE and 5G NR, we know that basically the smallest FFT size used corresponds to N=128. This implies that if we would approximate $$\frac{(N-1)}{N} \approx 1,$$

the maximum error would be only 0.8%. Therefore, we can do this approximation with a minor impact on the performance. What remains is a term, $e^{-j\pi k}$, which is a phase rotator providing values −1 or +1 depending on the value of k, as the phase is jumping with steps of $\pi$ radians. Thus, this term can be rewritten as $e^{-j\pi k}=(-1)^k$. Thus, the (algebraic) real-valued filter coefficients are at this point defined as $$C_i(k) = (-1)^k A_N(k,\hat{\varepsilon}_i) = \frac{(-1)^k \sin(\pi(k+\hat{\varepsilon}_i))}{N\sin\left(\frac{\pi(k+\hat{\varepsilon}_i)}{N}\right)}. \quad (3)$$

Then, by noting that typically $N \gg \hat{\varepsilon}_i$ and $N \gg k$, we can use a simplification $$N\sin\left(\frac{x}{N}\right) \approx x, N \gg x$$

to simplify the denominator. This simplification is again especially valid for modern communication systems employing a large value of N. The simplified real-valued filter coefficients are now defined as $$C_i(k) = \frac{(-1)^k \sin(\pi(k+\hat{\varepsilon}_i))}{N\sin\left(\frac{\pi(k+\hat{\varepsilon}_i)}{N}\right)} \approx \frac{(-1)^k \sin(\pi(k+\hat{\varepsilon}_i))}{\pi(k+\hat{\varepsilon}_i)}. \quad (4)$$

Additionally, the numerator can be also simplified into the following form, based on the well-known sine-function property sin(x+y)=[sin(x)cos(y)+cos(x)sin(y)]:

$$C_i(k) = \frac{(-1)^k \sin(\pi(k+\hat{\varepsilon}_i))}{\pi(k+\hat{\varepsilon}_i)} \quad (5)$$

$$= \frac{(-1)^k [\sin(\pi k)\cos(\pi\hat{\varepsilon}_i) + \cos(\pi k)\sin(\pi\hat{\varepsilon}_i)]}{\pi(k+\hat{\varepsilon}_i)}$$

$$= \frac{(-1)^k [0\cos(\pi\hat{\varepsilon}_i) + (-1)^k \sin(\pi\hat{\varepsilon}_i)]}{\pi(k+\hat{\varepsilon}_i)}$$

$$= \frac{\sin(\pi\hat{\varepsilon}_i)}{\pi(k+\hat{\varepsilon}_i)}.$$

The coefficients can be simplified even further by assuming that the normalized frequency offset estimate is small enough to satisfy the relation $\sin(\pi\hat{\varepsilon}_i)$:

$$C_i(k) = \frac{\sin(\pi\hat{\varepsilon}_i)}{\pi(k+\hat{\varepsilon}_i)} \approx \frac{\hat{\varepsilon}_i}{k+\hat{\varepsilon}_i}, \quad (6)$$

with $C_i(0) = 1$ if $\hat{\varepsilon}_i = 0$.

Accordingly, in an embodiment the relation between the frequency offset estimate and the combination of the frequency offset estimate and the filter coefficient index is the ratio described in Equation (6), i.e. the ratio between the carrier frequency offset estimate $\hat{\varepsilon}_i$ and the sum of the carrier frequency offset estimate $\hat{\varepsilon}_i$ and the filter coefficient index k. It should be appreciated that in some embodiments further factors are incorporated into the computation of block 204, e.g. a scaling factor and/or a biasing (offset) factor.

Computing the coefficients by using Equation (6) reduces the number of computational operations compared with using Equation (1). The computation of the coefficients on the basis of Equation (1) would rely on using tables to compute the trigonometric functions. By eliminating the trigonometric functions via the approximations described above, the need for the tables is also eliminated, thus reducing the memory resources required to compute the coefficients. Another distinguishing feature that simplifies the computation is that the coefficients are algebraic real values and independent on the FFT size. Yet another feature that simplifies the computation is the removal of the irrational number $\pi$(3.141592 . . . ).

It should be appreciated that Equation (6) may be manipulated into several mathematically equivalent solutions, for example the following alternative representation:

$$C_i(k) \approx \frac{\hat{\varepsilon}_i}{k+\hat{\varepsilon}_i} = \frac{1/\hat{\varepsilon}_i}{1/\hat{\varepsilon}_i} \frac{\hat{\varepsilon}_i}{k+\hat{\varepsilon}_i} = \frac{1}{k/\hat{\varepsilon}_i + 1}. \quad (7)$$

It should be noted that although the representation given by Equation (7) does not directly highlight the relation between the frequency offset estimate and the combination of the frequency offset estimate and the filter coefficient index, the formulation is mathematically equivalent to that of Equation (6) and, as a consequence, there is still the same relation. Furthermore, the representation of Equation (6) is more efficient in terms of computational complexity, because it involves only a half of division operations of the alternative representation, therefore being preferable from the viewpoint of implementation.

Figure 3:
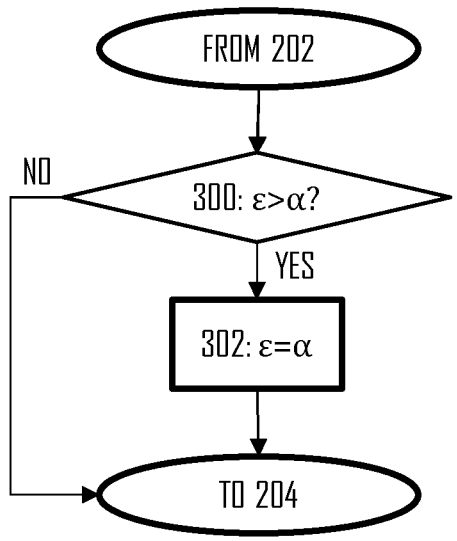
FIG. 3 illustrates a procedure for reducing a scaling error according to an embodiment.
Figure 3:
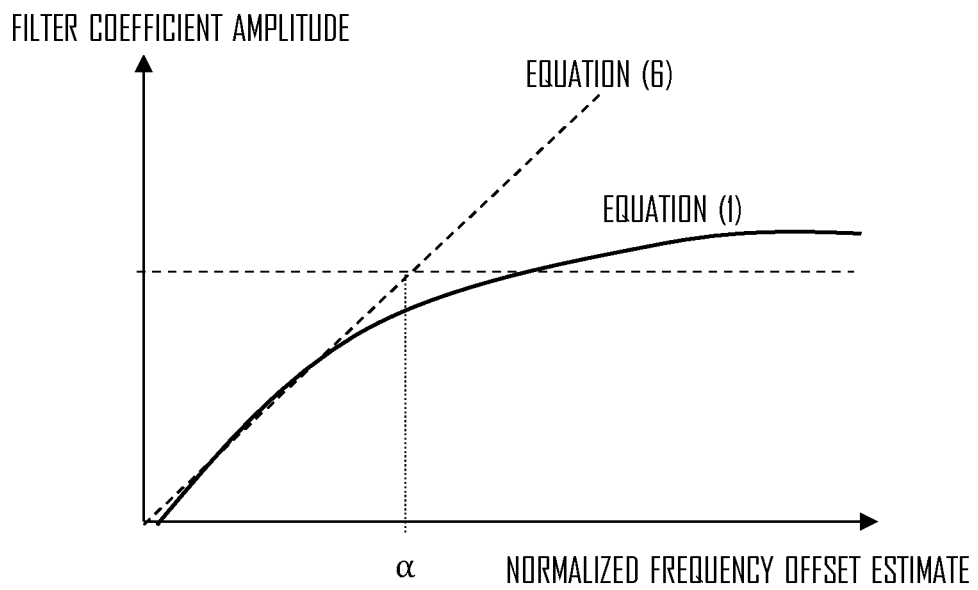

For large frequency offsets, the approximations made above to reach the relation of Equation (6) may cause some scaling error and, below, some embodiments for reducing the scaling error are presented. In an embodiment, an upper limit value for the frequency offset estimate (in the numerator of Equation (6)) is defined and, if the frequency offset estimate is greater than the upper limit value, the frequency offset estimate is replaced by the upper limit value in the computation of the coefficients. FIG. 3 illustrates such a process. Referring to FIG. 3, the upper limit value is represented by $\alpha$. The process may be carried out between blocks 202 and 204 or at another point before block 204. Referring to FIG. 3, the frequency offset estimate $\hat{\varepsilon}_i$ is compared with the upper limit value a in block 300. If the frequency offset estimate $\hat{\varepsilon}_i$ is greater than (or optionally equal to) the upper limit value $\alpha$, the process proceeds to block 302 where the frequency offset estimate $\hat{\varepsilon}_i$ is replaced by the upper limit value $\alpha$. Then, block 204 is computed by using the upper limit value $\alpha$ as the frequency offset estimate.

FIG. 3 also illustrates a graph of the effect of using the upper limit value. The solid line in FIG. 3 represents the amplitude of the coefficients computed by using Equation (1) (without approximations) as a function of the (normalized) frequency offset estimate, and the dashed line represents the amplitudes of the coefficients computed by using Equation (6) as a function of the (normalized) frequency offset estimate. In an optimal situation, the dashed line would follow the solid line. It can be seen that the approximation results in that the lines deviate at higher frequency offsets, e.g. above 0.3. The upper limit value a is thus used to limit the frequency offset estimate which effectively limits also the amplitude of the filter coefficients and 'turns' the dashed line to follow the solid line in FIG. 3, thus leading to better results even with the frequency offsets between 0.3 and 0.5. As a result, an embodiment provides the following relation as an improvement to Equation (6) to cover a full frequency offset range $-0.5 \leq \hat{\varepsilon}_i \leq 0.5$:

$$C_i(k) = \frac{\text{sign}(\hat{\varepsilon}_i)\min(|\hat{\varepsilon}_i|, \alpha)}{k+\hat{\varepsilon}_i}, \quad (7)$$

where, sign represents a sign operation, min represents taking a minimum value, and $\alpha$ is the upper limit value that is a design parameter limiting the scaling error with large absolute (|.|) values of $\hat{\varepsilon}_i$. The range of a may be limited between 0 and 0.5 and, in an embodiment, between 0.2 and 0.4. In some designs, $\alpha=0.3$ provides good performance, but this value can be further optimized for the desired implementation. With different designs, the optimal upper limit value may assume different values. As described above, the idea is to use the upper limit value to align the amplitude of the filter coefficients of the approximation of Equation (6) to follow the more accurately the amplitude of the filter coefficients computed by using Equation (1). The skilled person is capable of experimenting with different values and finding the suitable upper limit value to each implementation. For example, the skilled person may test various communication scenarios with different operational parameters and conditions and discover the deviation in the amplitudes resulting from the computation of the frequency offset estimate via Equation (1) and Equation (6) and, as a result, find the upper limit value that provides the greatest or at least acceptable correlation between the amplitudes of the coefficients computed via Equation (1) and amplitudes of the coefficients computed via Equation (6) or another embodiment described above, the amplitudes being a function of the frequency offset estimate. If the system design support only normalized frequency offsets up to the upper limit value, e.g. $\hat{\varepsilon}_i$=0.3, i.e. high frequency offsets are not anticipated, Equation (6) may be used instead of Equation (7) to reduce the complexity. Such system designs may relate, for example, to static scenarios where the transmitter and the receiver have low mobility. The skilled person may experiment for each system design the maximum achievable frequency offset and select the less complex embodiment using Equation (6) for low-mobility scenarios or the improved embodiment of Equation (7) for high-mobility scenarios.

Figure 4:
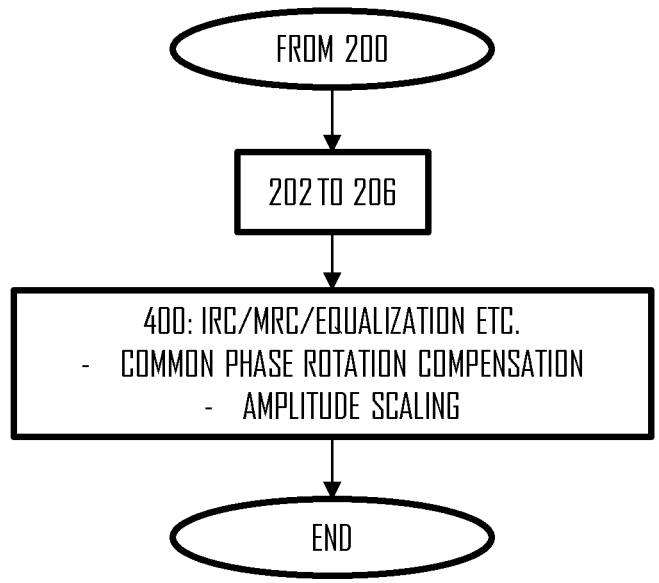
FIG. 4 illustrates a procedure for combining frequency offset reduction of FIG. 2 with another signal processing function according to an embodiment.

An alternative solution for eliminating or reducing the scaling error associated with the high frequency offsets is to use another scaling function that reduces the scaling error. For example, the scaling may be handled in the MRC/IRC processing where the same amplitude scaling may be applied to both channel estimates (reference/pilot symbols) and data symbols. Yet another alternative is to implement the scaling directly into the filter coefficients as a part of power normalization or another function controlling the amplitude of the filter coefficients. FIG. 4 illustrates such an embodiment.

Referring to FIG. 4, the receiver signal processing may include blocks 200 to 204 according to any one of the above-described embodiments. Furthermore, the apparatus performing the receiver signal processing may conduct other receiver signal processing functions such as the IRC, MRC, and/or channel equalization. Such functions are common to radio receivers for the purpose of compensating effects induced on the signals communicated over a radio channel, e.g. interference from other signals on the same frequency band, noise, multi-path propagation, and non-uniform attenuation. For example, there exists vast literature on IRC receiver algorithms, and the skilled person is capable of selecting a suitable receiver algorithm for each design. The same applies to MRC and channel equalization algorithms. Block 400 may incorporate the common phase rotation compensation described above. In such a case, the compensation may incorporate the term $$e^{-\frac{j\pi\hat{\varepsilon}_i(N-1)}{N}}$$

described above to improve the performance of the frequency offset compensation. Block 400 may be executed after blocks 200 to 206, before blocks 200 to 206, or even in parallel with blocks 200 to 206. As a consequence, a phase rotation error caused by the frequency offset common to all sub-carriers of the multi-carrier signal is reduced as a part of another radio receiver signal processing algorithm (different from block 204) performed on the received multi-carrier signal. Such another radio receiver signal processing algorithm may be or comprise the IRC, MRC, or the channel equalization algorithm configured to estimate and reduce distortion induced in a radio channel on the multi-carrier signal.

As described above, the frequency offset estimate may be normalized such that its values are limited between −0.5 and 0.5.

Figure 5:
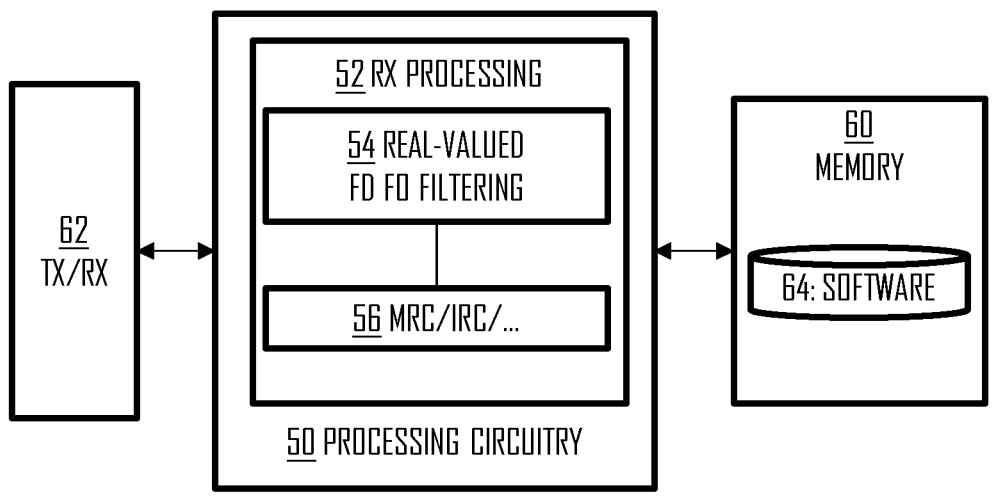
FIG. 5 illustrates a block diagram of a structure of an apparatus according to an embodiment.

FIG. 5 illustrates an apparatus according comprising a processing circuitry 50, such as at least one processor, and at least one memory 60 including a computer program code (software) 64, wherein the at least one memory and the computer program code (software) are configured, with the at least one processor, to cause the apparatus to carry out the process of FIG. 2 or any one of its embodiments described above. The apparatus may be for the terminal device 100 or for the access node, e.g. for the DU or CU. The apparatus may be a circuitry or an electronic device realizing some embodiments of the invention in the terminal device or the access node. The apparatus carrying out the above-described functionalities may thus be comprised in such a device, e.g. the apparatus may comprise a circuitry such as a chip, a chipset, a processor, a micro controller, or a combination of such circuitries for the terminal device or the access node. In other embodiments, the apparatus is generally for a radio device, e.g. the radio device or a circuitry in or designed to operate in the radio device.

The memory 60 may be implemented using any suitable data storage technology, such as semiconductor-based memory devices, flash memory, magnetic memory devices and systems, optical memory devices and systems, fixed memory and removable memory.

In an embodiment, the apparatus further comprises a radio transceiver 62 optionally with multiple antenna elements and multiple parallel transmitter chains and receiver chains. The processing circuitry 50 may comprise a receiver (RX) signal processing circuitry 52 configured to carry out baseband signal processing functions for data received through the radio transceiver 62, e.g. the process of FIG. 2. The receiver signal processing circuitry 52 may comprise a frequency-domain frequency offset filtering circuitry 54 configured to operate on real-valued (algebraic) numbers, thus providing the reduced computational complexity described above. Additionally, the receiver signal processing circuitry 52 may comprise one or more other receiver signal processing circuitries 56 coupled with the circuitry 54 to implement the process of FIG. 4, for example.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention. The processes or methods described in FIG. 3 or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising:
   at least one processor; and
   at least one memory including computer program code, the at least one memory and computer program code configured to, with the at least one processor, cause the apparatus to perform:
   acquiring a signal distorted by a frequency offset;
   estimating a frequency offset estimate describing the frequency offset;
   computing coefficients for a frequency-domain filter on the basis of a relation between the frequency offset estimate and a combination of the frequency offset estimate and an index of the frequency-domain filter, wherein the relation is defined as $$\frac{\text{Carrier frequency offset estimate}}{\text{Carrier frequency offset estimate} + \text{filter index}};$$

performing frequency-domain filtering of the signal by using the computed coefficients.

2. The apparatus of claim 1, wherein the at least one memory and computer program code are further configured, with the at least one processor, to cause the apparatus to set an upper limit value for the frequency offset estimate and, if the frequency offset estimate is greater than the upper limit value, to replace the frequency offset estimate by the upper limit value in the computation of the coefficients.

3. The apparatus of claim 2, wherein the relation is defined as $$\frac{\text{sign}(\varepsilon)\min(|\varepsilon|, \alpha)}{\varepsilon + k},$$

where $\varepsilon$, is the frequency offset estimate in a normalized form, $\alpha$ is the upper limit value, and k is the filter index.

4. The apparatus of claim 1, wherein the signal comprises a plurality of sub-carriers, and wherein the at least one memory and computer program code are further configured, with the at least one processor, to cause the apparatus to correct a phase rotation error, caused by the frequency offset, common to all sub-carriers of the signal as a part of another radio receiver signal processing algorithm performed on the signal.

5. The apparatus of claim 4, wherein said another radio receiver signal processing algorithm is a channel equalization algorithm configured to estimate and reduce distortion caused by a radio channel on the signal, or an interference rejection combining algorithm.

6. The apparatus of claim 4, wherein said another radio receiver signal processing algorithm is configured to incorporate a term $$e^{-\frac{jn\hat{\varepsilon}_i(N-1)}{N}}$$

where N represents a size of a Fourier transform and $\hat{\varepsilon}_i$ represents the frequency offset estimate.

7. The apparatus of claim 1, wherein the computed coefficients are real-valued algebraic numbers.

8. The apparatus of claim 1, wherein the apparatus comprises a terminal device of a cellular communication system.

9. A method comprising:
   acquiring a signal distorted by a frequency offset;
   estimating a frequency offset estimate describing the frequency offset;
   computing coefficients for a frequency-domain filter on the basis of a relation between the frequency offset estimate and a combination of the frequency offset estimate and an index of the frequency-domain filter, wherein the relation is defined as $$\frac{\text{Carrier frequency offset estimate}}{\text{Carrier frequency offset estimate} + \text{filter index}};$$

performing frequency-domain filtering of the signal by using the computed coefficients.

10. The method of claim 9, further comprising setting an upper limit value for the frequency offset estimate and, if the frequency offset estimate is greater than the upper limit value, replacing the frequency offset estimate by the upper limit value in the computation of the coefficients.

11. The method of claim 9, wherein the relation is defined as $$\frac{\text{sign}(\varepsilon)\min(|\varepsilon|, \alpha)}{\varepsilon + k},$$

where $\varepsilon$, is the frequency offset estimate in a normalized form, $\alpha$ is the upper limit value, and k is the filter index.

12. A computer program product embodied on a non-transitory computer-readable medium and comprising a computer program code readable by a computer, wherein the computer program code configures the computer to carry out a computer process comprising:
   acquiring a signal distorted by a frequency offset;
   estimating a frequency offset estimate describing the frequency offset;
   computing coefficients for a frequency-domain filter on the basis of a relation between the frequency offset estimate and a combination of the frequency offset estimate and an index of the frequency-domain filter, wherein the relation is defined as $$\frac{\text{Carrier frequency offset estimate}}{\text{Carrier frequency offset estimate} + \text{filter index}};$$

and
   performing frequency-domain filtering of the signal by using the computed coefficients.

* * * * *